United States Patent
Annen et al.

(10) Patent No.: US 10,330,267 B2
(45) Date of Patent: Jun. 25, 2019

(54) LIGHT EMISSION BODY AND ILLUMINATION DEVICE

(71) Applicant: SHARP KABUSHIKI KAISHA, Sakai, Osaka (JP)

(72) Inventors: Kazunori Annen, Sakai (JP); Yoshinobu Kawaguchi, Sakai (JP); Yoshiyuki Takahira, Kizugawa (JP); Koji Takahashi, Sakai (JP); Yosuke Maemura, Sakai (JP); Tomohiro Sakaue, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/757,344

(22) PCT Filed: May 31, 2016

(86) PCT No.: PCT/JP2016/066031
§ 371 (c)(1),
(2) Date: Mar. 2, 2018

(87) PCT Pub. No.: WO2017/038176
PCT Pub. Date: Mar. 9, 2017

(65) Prior Publication Data
US 2019/0024854 A1 Jan. 24, 2019

(30) Foreign Application Priority Data
Sep. 3, 2015 (JP) .................. 2015-174159

(51) Int. Cl.
*G02B 27/20* (2006.01)
*F21K 9/65* (2016.01)
(Continued)

(52) U.S. Cl.
CPC .................. *F21K 9/65* (2016.08); *F21K 9/64* (2016.08); *F21K 9/68* (2016.08); *F21S 2/00* (2013.01);
(Continued)

(58) Field of Classification Search
CPC ...... F21K 9/64–9/69; F21S 2/00; F21S 41/00; F21S 41/141–41/16; F21S 43/00;
(Continued)

(56) References Cited

U.S. PATENT DOCUMENTS

2013/0088852 A1  4/2013  Kamee et al.
2014/0369064 A1  12/2014  Sakaue et al.

FOREIGN PATENT DOCUMENTS

JP   2012-169049 A   9/2012
JP   2013-171844 A   9/2013
(Continued)

*Primary Examiner* — Jason M Han
(74) *Attorney, Agent, or Firm* — ScienBiziP, P.C.

(57) ABSTRACT

A light emission body capable of simultaneously improving spot feature and color unevenness of illumination light is provided. A light emission body (6) according to one embodiment of the present invention includes a fluorescent substance layer (61) having a light irradiation surface (61a) irradiated with laser light (L1) and a light emitting surface (61b) emitting the laser light (L1) and fluorescence (L2), a light absorption layer (62) that blocks the laser light (L1) and the fluorescence (L2) emitted from the light emitting surface (61b), and a scattering layer (63) that scatters the laser light (L1) and the fluorescence (L2) which are not blocked by the light absorption layer (62).

11 Claims, 7 Drawing Sheets

(51) Int. Cl.
*F21S 2/00* (2016.01)
*F21V 7/00* (2006.01)
*F21V 11/10* (2006.01)
*F21S 43/00* (2018.01)
*F21S 41/00* (2018.01)
*F21V 9/30* (2018.01)
*F21K 9/64* (2016.01)
*F21K 9/68* (2016.01)
*F21S 43/20* (2018.01)
*F21S 41/16* (2018.01)
*F21S 41/141* (2018.01)
*F21V 7/22* (2018.01)

(52) U.S. Cl.
CPC ............ *F21S 41/00* (2018.01); *F21S 41/141* (2018.01); *F21S 41/16* (2018.01); *F21S 43/00* (2018.01); *F21S 43/20* (2018.01); *F21V 7/00* (2013.01); *F21V 7/22* (2013.01); *F21V 9/30* (2018.02); *F21V 11/10* (2013.01)

(58) Field of Classification Search
CPC .... F21S 43/20; F21V 7/00; F21V 7/22; F21V 9/30; F21V 9/32; F21V 9/35; F21V 9/38; F21V 11/10
USPC .............................. 362/249.02, 259, 311.02
See application file for complete search history.

(56) References Cited

FOREIGN PATENT DOCUMENTS

| | | |
|---|---|---|
| JP | 2014-060121 A | 4/2014 |
| JP | 2014-154313 A | 8/2014 |
| JP | 2015-001709 A | 1/2015 |
| JP | 2015-002160 A | 1/2015 |
| JP | 2015-069884 A | 4/2015 |
| JP | 2015-149307 A | 8/2015 |
| WO | 2011/142179 A1 | 11/2011 |

LIGHT EMISSION BODY AND ILLUMINATION DEVICE

TECHNICAL FIELD

The present invention relates to a light emission body that receives excitation light and emits fluorescence, and an illumination device including the light emission body.

BACKGROUND ART

An illumination device or the like is developed which excites a fluorescent substance contained in a fluorescent substance layer by excitation light emitted from an excitation light source and generates fluorescence from the fluorescent substance. Such an illumination device is disclosed in PTL 1 to PTL 3.

PTL 1 discloses an illumination device in which spot feature of illumination light emitted from a fluorescent substance layer is improved. In the illumination device, the spot feature of the illumination light is improved by refracting light propagating into the fluorescent substance layer by using a hollow body.

PTLs 2 and 3 disclose an illumination device in which color unevenness of illumination light is reduced. In PTL 2, the illumination device in which a scattering layer that scatters light is disposed on a light emitting surface side of a fluorescent substance layer is proposed. In the illumination device, color unevenness of illumination light is reduced by scattering excitation light and fluorescence contained in irradiation light by using a scattering layer.

In addition, PTL 3 proposes the illumination device including a fluorescent substance layer provided with a plurality of holes penetrated in a thickness direction. In the illumination device, propagation of a part of light is blocked by a hole provided in the fluorescent substance layer, and thereby, a yellow ring may not be generated at an outer peripheral portion of the fluorescent substance layer, and color unevenness of illumination light may be reduced.

CITATION LIST

Patent Literature

PTL 1: Japanese Unexamined Patent Application Publication No. 2015-1709 (published on Jan. 5, 2015)

PTL 2: Japanese Unexamined Patent Application Publication No. 2014-154313 (published on Aug. 25, 2014)

PTL 3: Japanese Unexamined Patent Application Publication No. 2013-171844 (published on Sep. 2, 2013)

SUMMARY OF INVENTION

Technical Problem

However, spot feature of illumination light can be improved by a technique of PTL 1, but there is a problem that color unevenness of irradiation light cannot be improved. Meanwhile, techniques of PTLs 2 and 3 can reduce color unevenness of the irradiation light, but there is a problem that the spot feature of the illumination light may not be improved.

Accordingly, it is desired to develop a new technique capable of simultaneously improving the spot feature and the color unevenness of the illumination light.

The present invention is to solve the above problems of related art, and an object thereof is to provide a light emission body and an illumination device that can improve spot feature of illumination light while reducing color unevenness of illumination light.

Solution to Problem

In order to solve the above problems, a light emission body according to an aspect of the present invention includes a fluorescent substance layer that has a light irradiation surface which is irradiated with excitation light and a light emitting surface which is located on a side opposite to the light irradiation surface, and that emits the excitation light and fluorescence which is obtained by wavelength-converting a part of the excitation light, from the light emitting surface; a light blocking layer that blocks the excitation light and the fluorescence which are emitted from the light emitting surface; and a scattering layer that is provided on the light emitting surface side and scatters the excitation light and the fluorescence which are not blocked by the light blocking layer, in which the fluorescent substance layer is configured by a small void fluorescent substance plate that generates the fluorescence as the excitation light is applied, and in which the excitation light is laser light in a wavelength range larger than or equal to 420 nm and smaller than or equal to 490 nm.

Advantageous Effects of Invention

According to one aspect of the present invention, there are effects that it is possible to provide a light emission body capable of simultaneously improving spot feature and color unevenness of illumination light and to provide an illumination device including the light emission body.

DESCRIPTION OF EMBODIMENTS

Embodiment 1

An embodiment of the present invention will be described with reference to FIGS. 1 to 4 as follows. In the present embodiment, an example of an illumination device (a spotlight, a headlamp for a vehicle, and the like) including a light emission body according to the present invention will be described.

[Configuration of Illumination Device 1]

Figure 1:
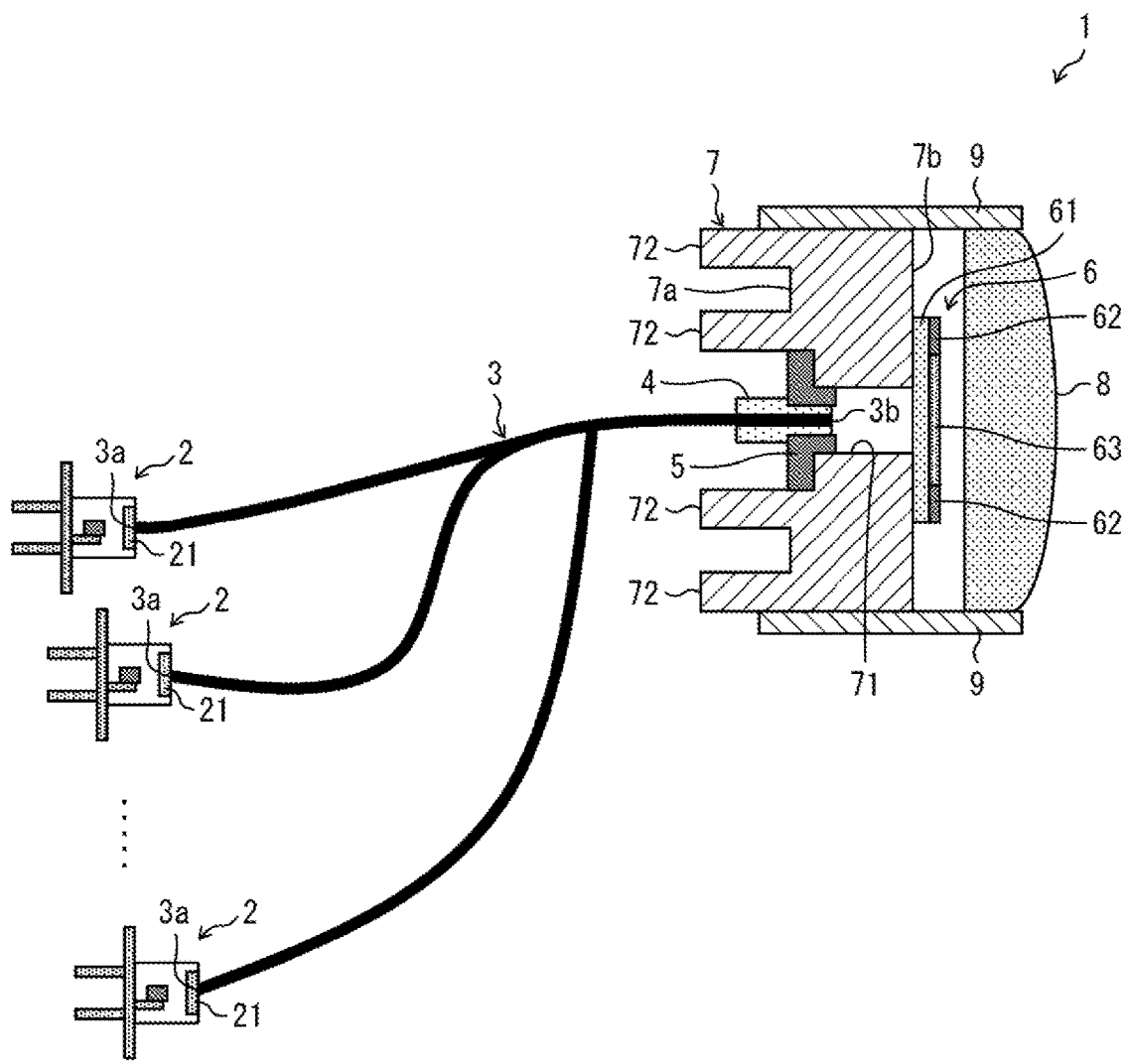
FIG. 1 is a sectional view illustrating a configuration of an illumination device according to Embodiment 1 of the present invention.

FIG. 1 is a sectional view illustrating a configuration of an illumination device 1 according to the present embodiment. The illumination device 1 emits light obtained by mixing a laser light emitted from a laser element 2 and fluorescence obtained by performing a wavelength conversion of a part of the laser light as illumination light.

As illustrated in FIG. 1, the illumination device 1 includes a laser element (excitation light source) 2, an optical fiber 3, a ferrule 4, a ferrule fixing portion 5, a light emission body 6, a metal base 7, a light-transmitting lens 8, and a lens fixing portion 9.

(Laser Element 2)

The laser element 2 is an excitation light source that emits laser light (excitation light). In the present embodiment, the illumination device 1 includes a plurality of laser elements 2. The laser light emitted from the laser element 2 has a uniform spatial and temporal phase, and a wavelength thereof is a single wavelength. Accordingly, by using the laser light as the excitation light, it is possible to efficiently excite a fluorescent substance contained in the light emission body 6, and to obtain illumination light with high luminance.

The laser element 2 appropriately sets a wavelength and a light output of the laser light which is emitted, according to the type of the fluorescent substance included in the light emission body 6. For example, it is possible to select the laser light having a wavelength range, for example, from 420 nm or more to 490 nm or less as the excitation light.

The laser light emitted from each of the plurality of laser elements 2 is incident on an incidence end portion 3a of the optical fiber 3, is emitted from an emission end portion 3b located on a side opposite to the incidence end portion 3a, and is applied to light emission body 6. A part of the laser light applied to the light emission body 6 is converted into fluorescence by the fluorescent substance included in the light emission body 6.

In a case where the laser light emitted from the laser element 2 is incident on the incidence end portion 3a of the optical fiber 3, it is preferable to use an aspheric lens 21 in order to make the laser light to be appropriately incident on the incidence end portion 3a. It is preferable that the aspheric lens 21 is formed of a material with high transmittance of laser light emitted from the laser element 2 and excellent heat-resistance property.

The number of the used laser elements 2 can be appropriately selected according to a required output. Thus, only one laser element 2 may be used. However, in a case where laser light of high power is required to obtain, it is preferable to use a plurality of laser elements 2 as in the present embodiment.

In addition, a light emitting diode (LED; Light Emitting Diode) or the like may be included as an excitation light source instead of the laser element 2. The excitation light source may be any material as long as the material emits excitation light capable of exciting a fluorescent substance contained in the light emission body 6, and a type thereof is not limited in particular.

(Optical Fiber 3)

The optical fiber 3 is a light guide member that guides the laser light emitted from the laser element 2. In the present embodiment, the optical fiber 3 is a bundle fiber in which a plurality of optical fibers are bundled.

The optical fiber 3 includes the incidence end portion 3a on which the laser light is incident and the emission end portion 3b from which the laser light incident from the incidence end portion 3a is emitted. The incidence end portion 3a side of the optical fiber 3 is connected to the laser element 2. In addition, the emission end portion 3b side of the optical fiber 3 is held by the ferrule 4 and is connected to the metal base 7 via the ferrule fixing portion 5.

(Ferrule 4)

The ferrule 4 is a holding member that holds the emission end portion 3b side of the optical fiber 3. The ferrule 4 is attached to a peripheral surface on the emission end portion 3b side of the optical fiber 3. The ferrule 4 has, for example, a plurality of holes into which the emission end portion 3b can be inserted.

In a case where one optical fiber 3 is used, it is also possible to omit the ferrule 4. However, even in a case where one optical fiber 3 is used, it is preferable to provide the ferrule 4 in order to fix the emission end portion 3b at an appropriate location.

(Ferrule Fixing Portion 5)

The ferrule fixing portion 5 is a fixing member that fixes the ferrule 4 to the metal base 7. The ferrule fixing portion 5 is a tubular member with a light blocking property. The ferrule fixing portion 5 is inserted from one end side of an excitation light passing hole 71 formed in a thickness direction of the metal base 7 and is fixed to the metal base 7. The ferrule fixing portion 5 fixes the ferrule 4 to the base 7 at an angle at which the laser light emitted from the emission end portion 3b of the optical fiber 3 is appropriately applied to the light emission body 6 disposed on the other end side of the excitation light passing hole 71.

The ferrule fixing portion 5 is desired to be a member which does not absorb light, and is formed of, for example, aluminum or the like.

(Light Emission Body 6)

The light emission body 6 is a stacked structure body that emits laser light and illumination light including fluorescence obtained by wavelength-converting a part of the laser light by applying the laser light. The light emission body 6 includes a fluorescent substance layer 61, a light absorption layer 62, and a scattering layer 63. The light emission body 6 is disposed such that the fluorescent substance layer 61 is in contact with a front surface 7b of the metal base 7 so as to cover the excitation light passing hole 71. The light emission body 6 emits the laser light and the illumination light including the fluorescence toward the light-transmitting lens 8. Details of the light emission body 6 will be described below.

(Metal Base 7)

The metal base 7 is a support member that supports the light emission body 6. The metal base 7 is formed of metal (for example, aluminum, copper or iron). Accordingly, the metal base 7 has high thermal conductivity and can efficiently dissipate heat generated in the fluorescent substance layer 61.

The excitation light passing hole 71 penetrating a central portion of the metal base 7 in a thickness direction (left-right direction in a page of FIG. 1) is formed in the metal base 7. One end of the excitation light passing hole 71 is opened in a rear surface 7a of the metal base 7. In addition, the other end of the excitation light passing hole 71 is open in the front surface 7b of the metal base 7.

The emission end portion 3b of the optical fiber 3 is disposed in an opening on a side of one end (the rear surface 7a of the metal base 7) of the excitation light passing hole 71. In addition, the light emission body 6 is disposed so as to cover the opening, in the opening on a side of the other end (the front surface 7b of the metal base 7) of the excitation light passing hole 71. Accordingly, the laser light emitted from the emission end portion 3b of the optical fiber 3 passes through the excitation light passing hole 71 of the metal base 7 and is applied to the fluorescent substance layer 61 of the light emission body 6.

The metal base 7 dissipates heat generated in the fluorescent substance layer 61 via a heat dissipation fin 72 and the like. A plurality of heat dissipation fins 72 are provided on the rear surface 7a of the metal base 7, and function as a heat dissipation mechanism that dissipates heat of the metal base 7 into the air.

The heat dissipation fin 72 increases heat dissipation efficiency by increasing a contact region with the atmosphere. In the same manner as the metal base 7, it is preferable to use a material with a high thermal conductivity for the heat dissipation fins 72.

(Light-Transmitting Lens 8)

The light-transmitting lens 8 is an optical member that transmits the laser light and illumination light including fluorescence, which are emitted (output) from the light emission body 6. The light-transmitting lens 8 transmits the illumination light in a predetermined angle range by refracting the laser light and the illumination light including fluorescence, which are emitted from the light emission body 6.

The light-transmitting lens 8 is formed of, for example, acrylic resin, polycarbonate, silicon, borosilicate glass, BK7, quartz or the like. The light-transmitting lens 8 is supported by the lens fixing portion 9 at a location facing the light emission body 6.

The number of the light-transmitting lenses 8 may be one, or may be plural. In addition, a shape of the light-transmitting lens 8 may be either an aspheric lens or a spherical lens. The number and shapes of the light-transmitting lenses 8 which are used are appropriately selected as necessary.

(Lens Fixing Portion 9)

The lens fixing portion 9 is a fixing member that fixes the light-transmitting lens 8 to the metal base 7. The lens fixing portion 9 is formed of a tubular member with a light blocking property. The lens fixing portion 9 holds a peripheral surface of the metal base 7 and a peripheral surface of the light-transmitting lens 8, on an inner surface thereof. The laser light and the illumination light including fluorescence which are emitted from the light emission body 6 can be incident on the light-transmitting lens 8 by using the lens fixing portion 9 without being leaked to the outside.

The lens fixing portion 9 is desired to be formed of a material with a high heat dissipation property, and particularly, a member which is formed of aluminum and is subjected to anodizing on a surface thereof can be suitably used.

[Details of Light Emission Body 6]

Figure 2:
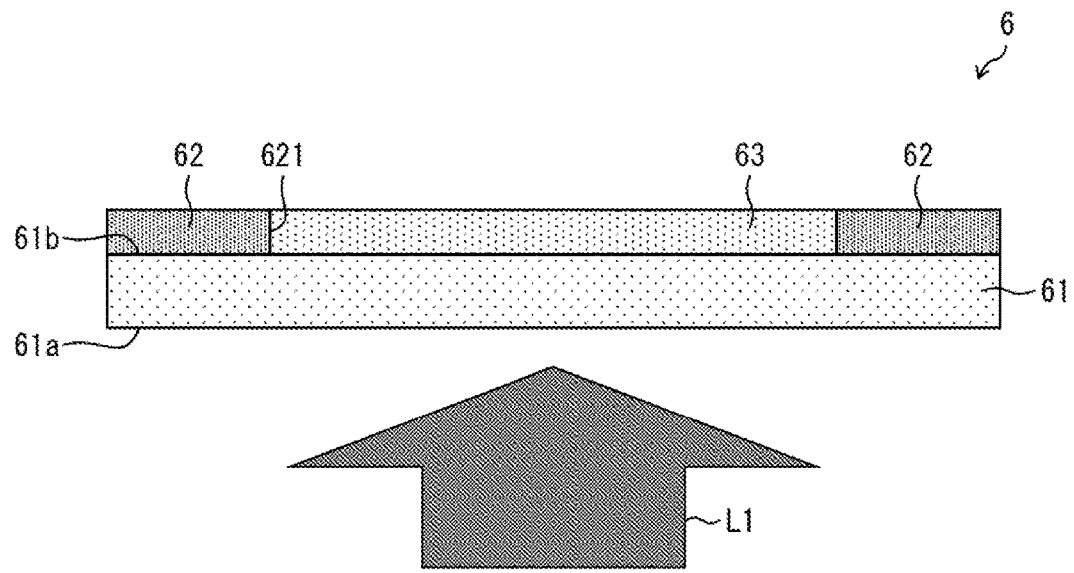
FIG. 2 is a sectional view illustrating a configuration of a light emission body illustrated in FIG. 1.

FIG. 2 is a sectional view illustrating a configuration of the light emission body 6 illustrated in FIG. 1. As illustrated in FIG. 2, the light emission body 6 includes the fluorescent substance layer 61, the light absorption layer 62, and the scattering layer 63. The light emission body 6 has a configuration in which the light absorption layer 62 and the scattering layer 63 are patterned on a light emitting surface 61b of the fluorescent substance layer 61.

(Fluorescent Substance Layer 61)

The fluorescent substance layer 61 is a layer that generates fluorescence L2 (see FIG. 4) by applying laser light L1 emitted from the emission end portion 3b of the optical fiber 3. The fluorescent substance layer 61 includes a fluorescent substance that generates fluorescence L2 as the laser light L1 is applied thereto.

The fluorescent substance layer 61 has a light irradiation surface 61a which is a lower surface facing the emission end portion 3b of the optical fiber 3 and a light emitting surface 61b which is a front surface located on a side opposite to the light irradiation surface 61a. The fluorescent substance layer 61 generates the fluorescence L2 obtained by wavelength-converting a part of the laser light L1 which is applied to the light irradiation surface 61a and emits the laser light L1 and the fluorescence L2 from the light emitting surface 61b. That is, the fluorescent substance layer 61 is a transmissive wavelength conversion member in which the light irradiation surface 61a irradiated with the laser light L1 faces the light emitting surface 61b that emits the laser light L1 and the fluorescence L2.

The fluorescent substance layer 61 is desired to be formed of a garnet-based small void fluorescent substance plate. The small void fluorescent substance plate means a fluorescent substance plate in which a width (hereinafter, referred to as a void width) of a void existing in a fluorescent substance plate is one tenth of or less than a wavelength of visible light. More specifically, the small void fluorescent substance plate means a fluorescent substance plate having a void width larger than or equal to 0 nm and less than or equal to 40 nm. That is, if the void width is represented by a symbol t, 0 nm≤t≤40 nm. The "small void fluorescent substance plate" may be referred to as a "small void fluorescent substance member".

It should be noted that meaning of the term "small void fluorescent substance plate" includes not only a fluorescent substance plate in which voids exist (0 nm≤t≤40 nm) but also a fluorescent substance plate in which a void does not exist (t=0 nm). That is, in one aspect of the present invention, the term "small void" includes the meaning "no void exists".

In addition, the above-described "void" means a gap (in other word, grain boundary) between crystals in the fluorescent substance plate. As an example, the void is a cavity in which only air exists. However, some foreign matter (for example, alumina or the like which is a raw material of the fluorescent substance plate) may enter the inside of the void.

Figure 3:
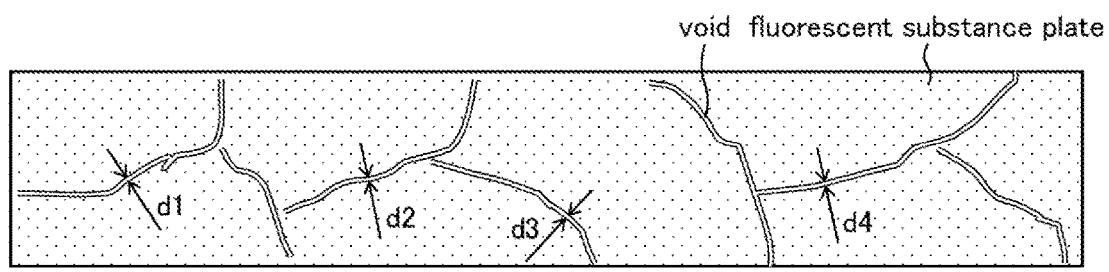
FIG. 3 is a schematic view illustrating a void width in a small void fluorescent substance plate which is an example of a fluorescent substance layer illustrated in FIG. 2.

In addition, the above-described "void width" means a maximum value of a distance between adjacent crystals (crystal grains) in the fluorescent substance plate. FIG. 3 is a schematic view illustrating the void width in the small void fluorescent substance plate. In FIG. 3, distances d1 to d4 are illustrated as distances between adjacent crystals. For example, if the distance d1 is the largest distance among the distances d1 to d4, the distance d1 is the void width.

In order to measure the distances d1 to d4, a cross section of the fluorescent substance plate is cut out, and thereafter, an observation image of the cross section may be obtained by a measurement device such as an optical microscope, a SEM (Scanning Electron Microscope), or a TEM (Transmission Electron Microscope). The distances d1 to d4 can be measured by analyzing the observation image. That is, it is possible to measure the void width.

The small void fluorescent substance plate has excellent thermal conductivity because the void width is 0 nm≤t≤40 nm. Accordingly, even in a case where the laser light L1 of high density is applied, a temperature of the fluorescent substance layer 61 hardly rises, and light emission efficiency is hardly lowered. Thus, the light emission body 6 with high luminance and high efficiency can be realized by using a small void fluorescent substance plate as the fluorescent substance layer 61.

Particularly, a small void fluorescent substance plate (fluorescent substance single crystal plate) having a void width of t=0 has good crystallinity (few defects), and thus, the plate has good temperature characteristic and light emission efficiency is less likely to decrease. Thus, it is preferable to use a small void fluorescent substance plate having a void width of t=0 as the fluorescent substance layer 61, and thereby, it is possible to suitably realize the light emission body 6 with high luminance and high efficiency.

In a case where the small void fluorescent substance plate is formed of a polycrystalline fluorescent substance, a fluorescent substance raw material powder is first obtained by a liquid phase method or a solid phase method by using oxide powder of submicron size as a raw material. For example, in a case where the fluorescent substance raw material powder is a YAG:Ce fluorescent substance, the oxide is yttrium oxide, aluminum oxide, cerium oxide or the like. Thereafter, the fluorescent substance raw material powder is formed by a metal mold or the like and is vacuum-sintered.

By using the above-described method, a small void fluorescent substance plate having a void width larger than 0 nm and smaller than or equal to 40 nm (that is, 0 nm≤t≤40 nm) is obtained. Since the small void fluorescent substance plate has a narrow void width, thermal conductivity thereof is high. Accordingly, a temperature of the small void fluorescent substance plate hardly rises even if excitation light with high density is applied. Thus, by using the small void fluorescent substance plate formed of polycrystalline fluorescent substance as the fluorescent substance layer 61, a decrease in the light emission efficiency of the fluorescent substance layer 61 can be suppressed, and thereby, it is possible to realize the light emission body 6 with high luminance and high efficiency.

In addition, in a case where the small void fluorescent substance plate is formed of a single crystal fluorescent substance, a liquid phase method, for example, CZ (Czochralski) method can be taken as an example of a method of manufacturing a small void fluorescent substance plate. Specifically, first, oxide powder becomes mixed powder by dry mixing or the like, and the mixed powder is put into a crucible and heated, and thereby, melted liquid is obtained. Next, a seed crystal (for example, YAG single crystal in a case of YAG) of a fluorescent substance is prepared, the seed crystal comes into contact with the melted liquid, and thereafter, the seed crystal is pulled up while rotating. At this time, the pull-up temperature is approximately 2000° C. Thereby, for example, a single crystal ingot in the <111> direction can be grown. Thereafter, the ingot is cut into a desired size. At this time, a single crystal ingot in such as <001> or <110> direction can also be obtained depending on a cutting method.

Since the single crystal ingot obtained by the above-described method has no void (for example, t=0), the single crystal ingot has a higher thermal conductivity as compared with a small void fluorescent substance plate formed of a polycrystalline fluorescent substance (approximately 10 W/m-K). Accordingly, the temperature of the small void fluorescent substance plate hardly rises in a case where excitation light with high density is applied. Thus, the light emission body 6 with higher luminance and higher efficiency can be realized by using a small void fluorescent substance plate formed of a single crystal fluorescent substance as the fluorescent substance layer 61. In addition, according to the above-described method, the single crystal ingot is obtained from melted liquid at a temperature higher than or equal to a melting point of a fluorescent substance, thereby, having high crystallinity. That is, defects in the small void fluorescent substance plate are reduced. Accordingly, a temperature characteristic of the small void fluorescent substance plate is improved, and it is possible to suppress a decrease in the light emission efficiency due to the rise in temperature.

However, materials other than the small void fluorescent substance plate such as a fluorescent substance single crystal plate and a fluorescent substance polycrystalline plate may be used as the fluorescent substance layer 61. For example, a material or the like in which a fluorescent substance is dispersed in a sealing material can be used as the fluorescent substance layer 61.

In this case, a sealing material of the fluorescent substance layer 61 is a resin material such as a glass material (inorganic glass, organic-inorganic hybrid glass) or a silicone resin. Low melting point glass may be used as the glass material. It is preferable that the sealing material has high transparency, and in a case where the laser light L1 has high output, it is preferable that the sealing material has high heat resistance.

A type of the fluorescent substance contained in the fluorescent substance layer 61 is appropriately selected depending on a wavelength of the laser light L1 which is applied. For example, it is possible to preferably use fluorescent substance single crystal plates or fluorescent substance polycrystalline plates of YAG:Ce (yellow), GAGG:Ce (yellow), and LuAG:Ce (green).

Here, in a case where the illumination device 1 is used as a head lamp for a vehicle (vehicle head lamp), it is requested to turn the illumination light L3 (see FIG. 4) into white having a chromaticity of a predetermined range. In this case, in order to make the illumination light of the illumination device 1 white, a combination of the laser light L1 and the fluorescent substance is appropriately selected.

For example, white illumination light L3 can be suitably obtained by applying blue laser light L1 to the fluorescent substance layer 61 which is a YAG-based fluorescent substance single crystal plate or a fluorescent substance polycrystalline plate.

(Light Absorption Layer 62)

The light absorption layer 62 is a layer that absorbs the laser light L1 and the fluorescence L2 emitted from the light emitting surface 61b. The light absorption layer 62 is formed of, for example, a black ceramic plate, a film deposited with black alumina or the like, a film including particles such as black alumina sealed in a resin such as silicon or acrylic, or the like.

The light absorption layer 62 is provided so as to cover a peripheral edge portion of the light emitting surface 61b of the fluorescent substance layer 61. In other words, the light absorption layer 62 has a light passing hole 621 through which the laser light L1 and the fluorescence L2 emitted from the light emitting surface 61b of the fluorescent substance layer 61 pass, on an optical axis of the laser light L1 applied to the light irradiation surface 61a of the fluorescent substance layer 61.

A central axis of the light passing hole 621 substantially coincides with an optical axis of the laser light L1 applied to the light irradiation surface 61a of the fluorescent substance layer 61. Thereby, the laser light L1 applied to the light irradiation surface 61a and the fluorescence L2 generated by the fluorescent substance layer 61 can be efficiently incident on the light passing hole 621.

In addition, a dimension (diameter) of the light passing hole 621 is equal to a beam diameter of the laser light L1 applied to the light irradiation surface 61a of the fluorescent substance layer 61 or is larger than the beam diameter. In other words, the dimension of the light passing hole 621 is equal to a dimension (diameter) of an irradiation spot of the laser light L1 applied to the light irradiation surface 61a of the fluorescent substance layer 61, or is larger than the dimension of the irradiation spot. Thereby, the laser light L1 applied to the light irradiation surface 61a and the fluorescence L2 generated by the fluorescent substance layer 61 can be efficiently incident on the light passing hole 621.

(Scattering Layer 63)

The scattering layer 63 is a layer that scatters the laser light L1 and the fluorescence L2 which are not blocked by the light absorption layer 62. The scattering layer 63 is a light-transmitting plate having a front surface on which fine roughness is formed, a layer in which particles such as alumina are deposited, a film including particles such as alumina sealed in a resin such as silicon or acrylic, or a film on which a fluorescent substance of sCASN:Eu (orange) or CASN:Eu (red) is deposited.

Particularly, in a case where the light absorption layer 62 is a film in which particles such as alumina are sealed in a resin such as silicon or acrylic, the heat generated in the fluorescent substance layer 61 due to application of the laser light L1 can be efficiently dissipated by the light absorption layer 62. Accordingly, it is possible to suppress deterioration of the fluorescent substance layer 61 due to heat.

The scattering layer 63 is buried in the light passing hole 621 of the light absorption layer 62. Accordingly, the laser light L1 and the fluorescence L2 passing through the light passing hole 621 are necessarily scattered by the scattering layer 63. Thus, it is possible to reliably mix the laser light L1 and the fluorescence L2.

In addition, a thickness of the entire light emission body 6 can be reduced by burying the scattering layer 63 in the light passing hole 621 of the light absorption layer 62. Thus, it is possible to reduce a thickness of the light emission body 6.

As such, the light emission body 6 has a configuration in which the light absorption layer 62 is provided so as to cover a peripheral edge portion of the light emitting surface 61b of the fluorescent substance layer 61, and thereby, the light passing hole 621 is formed and the scattering layer 63 is buried so as to close the light passing hole 621. In other words, the light emission body 6 has a configuration in which the scattering layer 63 is provided on an optical axis of the laser light L1 applied to the light irradiation surface 61a of the fluorescent substance layer 61 and the light absorption layer 62 is provided so as to surround the scattering layer 63.

Figure 4:
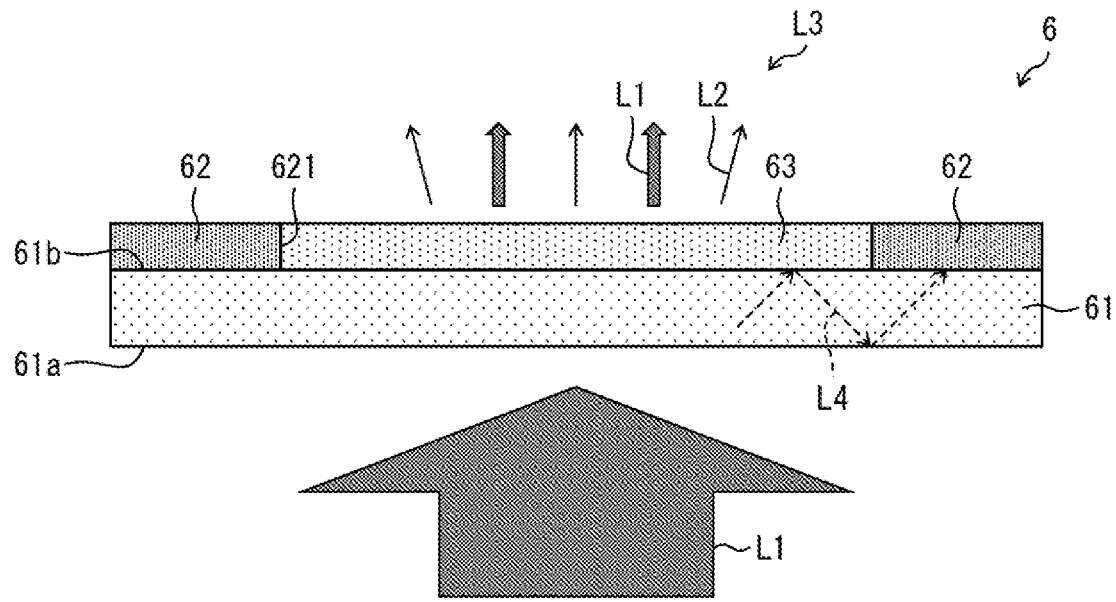
FIG. 4 is a sectional view illustrating an action of the light emission body illustrated in FIG. 2.

FIG. 4 is a sectional view illustrating an action of the light emission body 6 illustrated in FIG. 2. As illustrated in FIG. 4, the laser light L1 is applied to the light irradiation surface 61a of the fluorescent substance layer 61, and thereby the light emission body 6 emits the illumination light L3 obtained by mixing the laser light L1 and the fluorescence L2 obtained by wavelength-converting a part of the laser light L1, from the scattering layer 63.

Among the laser light L1 and the fluorescence L2 emitted from the light emitting surface 61b of the fluorescent substance layer 61, the laser light L1 and fluorescence L2 incident on the light passing hole 621 of the light absorption layer 62 are scattered by the scattering layer 63, and thereafter, are emitted toward the light-transmitting lens 8.

Meanwhile, among the laser light L1 and the fluorescence L2 emitted from the light emitting surface 61b of the fluorescent substance layer 61, the laser light L1 and the fluorescence L2 that are not incident on the light passing hole 621, that is, the laser light L1 propagated in an in-layer direction of the fluorescent substance layer 61 and stray light L4 which is the fluorescence L2 are absorbed by the light absorption layer 62. Thereby, it is possible to suppress emission of the stray light L4 from the light emitting surface 61b.

As such, in the light emission body 6, the laser light L1 and the fluorescence L2 passing through the light passing hole 621 of the light absorption layer 62 are emitted toward the light-transmitting lens 8, and are used as the illumination light L3. Accordingly, by adjusting a dimension (diameter) of the light passing hole 621, it is possible to change a size of an emission region of the illumination light L3 in the light emission body 6. For example, by reducing the dimension of the light passing hole 621, the emission region of the illumination light L3 in the light emission body 6 can be formed into a small spot shape. Thereby, it is possible to improve spot feature of the illumination light L3.

In addition, since the light passing hole 621 is closed by the scattering layer 63 in the light emission body 6, the laser light L1 and the fluorescence L2 passing through the light passing hole 621 are necessarily scattered by the scattering layer 63. Accordingly, it is possible to sufficiently mix the laser light L1 and the fluorescence L2, and to reduce the color unevenness of the illumination light L3.

Since the laser light L1 has a narrower light distribution as compared with light of an LED or the like, color unevenness of the illumination light L3 easily occurs in a case where the laser light L1 is used as excitation light.

In addition, in a case where the void width is smaller than or equal to 40 nm in a small void fluorescent substance plate such as a fluorescent substance single crystal plate or a fluorescent substance polycrystalline plate as described above, it is found that scattering (internal scattering) effects on laser light L1 and fluorescence L2 do not occur at all or hardly occur, as a result of examination. The above-described "smaller than or equal to 40 nm" indicates a value that the void width becomes approximately one tenth or smaller with respect to a wavelength of the laser light L1 (in a case of blue light: larger than or equal to 420 nm and smaller than or equal to 490 nm) which is excitation light or a wavelength of the fluorescence L2 (light having longer wavelength than the excitation light). Results of the above examination are in agreement with a general view that Mie scattering does not occur in a case where a scattering body is irradiated with light, if a size of the scattering body becomes approximately one tenth or less of the light.

As such, the scattering effects do not occur at all, or hardly occur in the small void fluorescent substance plate. Accordingly, in a case where a small void fluorescent substance plate is used as the fluorescent substance layer 61, a decrease in the spot feature of the illumination light L3 and the color unevenness becomes remarkable.

However, in the light emission body 6, the decrease in the spot feature of the illumination light L3 and the color unevenness can be suitably reduced by the light absorption layer 62 and the scattering layer 63. Thus, the light emission body 6 is particularly effective in a case where the laser light L1 is combined with a small void fluorescent substance plate such as a fluorescent substance single crystal plate or a fluorescent substance polycrystalline plate, and it is possible to improve the spot feature of the illumination light L3 and reduce the color unevenness of the illumination light L3 and to realize emission of light with high luminance.

[Effects of Illumination Device 1]

The illumination device 1 according to the present embodiment includes the light emission body 6. The light emission body 6 has the light irradiation surface 61a irradiated with the laser light L1 and the light emitting surface 61b located on a side opposite to the light irradiation surface 61a, and includes the fluorescent substance layer 61 that emits the laser light L1 and the fluorescence L2 obtained by wavelength-converting a part of the laser light L1 from the light emitting surface 61b, the light absorption layer 62 that is provided on the light emitting surface 61b side and has the light passing hole 621 through which the laser light L1 and the fluorescence L2 emitted from the light emitting surface 61b pass, and the scattering layer 63 that is buried so as to close the light passing hole 621 and scatters the laser light L1 and the fluorescence L2.

In the light emission body 6, the laser light L1 and the fluorescence L2 incident on the light passing hole 621, among the laser light L1 and the fluorescence L2 emitted from the light emitting surface 61b, pass through the light passing hole 621 and are emitted outside the light emission body 6. Meanwhile, among the laser light L1 and the fluorescence L2 emitted from the light emitting surface 61b, the laser light L1 and the fluorescence L2 which are not incident on the light passing hole 621, that is, the laser light L1 propagated in an in-layer direction of the fluorescent substance layer 61 and the stray light L4 which is the fluorescence L2 are blocked by the light absorption layer 62.

Accordingly, by adjusting a dimension (diameter) of the light passing hole 621, it is possible to change a size of an emission region of the illumination light L3 in the light emission body 6, and to improve spot feature of the illumination light L3.

In addition, the light passing hole 621 is closed by the scattering layer 63, in the light emission body 6. Accordingly, the laser light L1 and the fluorescence L2 passing through the light passing hole 621 are necessarily scattered by the scattering layer 63, and thus, it is possible to reduce color unevenness of the illumination light L3.

Thus, according to the present embodiment, it is possible to realize the light emission body 6 that can simultaneously improve spot feature of the illumination light L3 and reduce color unevenness of the illumination light L3 and the illumination device 1 including the light emission body 6.

In a case where the light-transmitting lens 8 that transmits the illumination light L3 emitted from the light emission body 6 is installed in the immediate vicinity of the light emission body 6 as in the illumination device 1, a part of the illumination light L3 is reflected by the light-transmitting lens 8, and thereby, reflection components directed from the light-transmitting lens 8 to the light emission body 6 are generated. In a case where the reflection components are reflected by the light emission body 6 and are incident on the light-transmitting lens 8, intensity of illumination of the illumination light L3 transmitted by the light-transmitting lens 8 is non-uniform.

In the light emission body 6, the reflection components from the light-transmitting lens 8 toward the light emission body 6 can be absorbed by the light absorption layer 62. Accordingly, in the illumination device 1, the amount of light of the reflection components incident on the light-transmitting lens 8 is greatly reduced, and thus, it is possible to reduce non-uniformity of the intensity of illumination of the illumination light L3 transmitted by the light-transmitting lens 8.

Embodiment 2

Another embodiment according to the present invention will be described with reference to FIG. 5 and FIG. 6 as follows. In the present embodiment, another configuration example of the light emission body according to the present invention will be described.

For the sake of convenient description, members having the same functions as the members described in the above embodiment are denoted by the same reference numerals or symbols, and description thereof will be omitted.

[Configuration of Light Emission Body 16]

Figure 5:
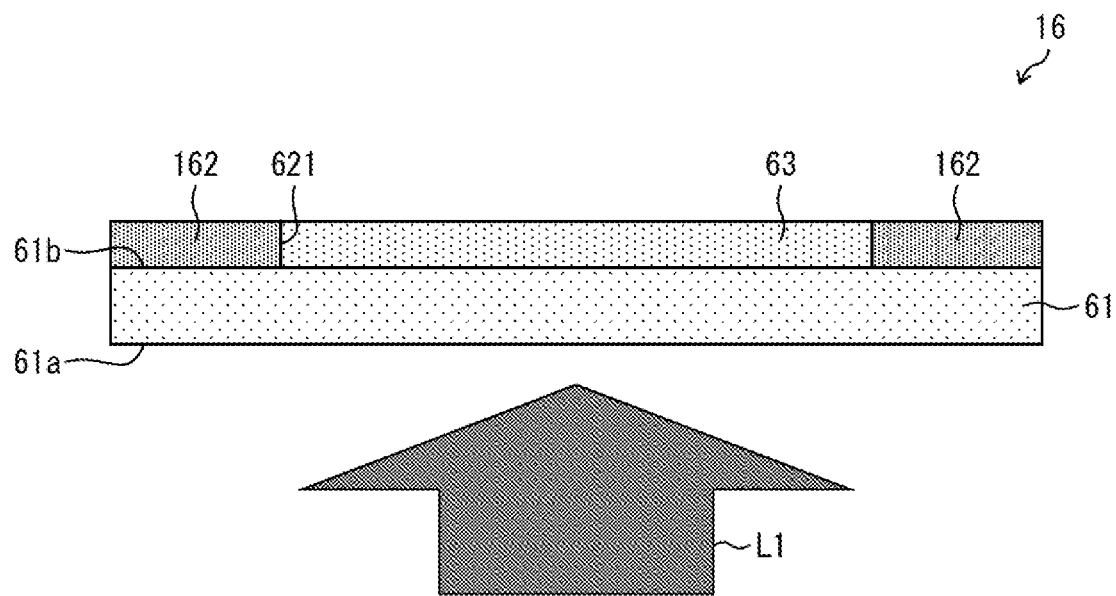
FIG. 5 is a sectional view illustrating a configuration of a light emission body according to Embodiment 2 of the present invention.

FIG. 5 is a sectional view illustrating a configuration of the light emission body 16 according to the present embodiment. As illustrated in FIG. 5, the light emission body 16 includes the fluorescent substance layer 61, a reflective layer (light blocking layer) 162, and the scattering layer 63. The light emission body 16 differs from the light emission body described in the above embodiment in that the light emission body includes the reflective layer 162 instead of the light absorption layer 62.

(Reflective Layer 162)

The reflective layer 162 is a layer that reflects the laser light L1 and the fluorescence L2 emitted from the light emitting surface 61b. The reflective layer 162 is, for example, a film formed of aluminum (Al) or silver (Ag), a white ceramic plate, a film deposited with particles such as alumina, a film including particles such as alumina sealed in a resin such as silicone or acrylic, or the like.

The reflective layer 162 has a light passing hole 621 through which the laser light L1 and the fluorescence L2 emitted from the light emitting surface 61b of the fluorescent substance layer 61 pass, on an optical axis of the laser light L1 applied to the light irradiation surface 61a of the fluorescent substance layer 61. The light passing hole 621 is closed by the scattering layer 63.

Figure 6:
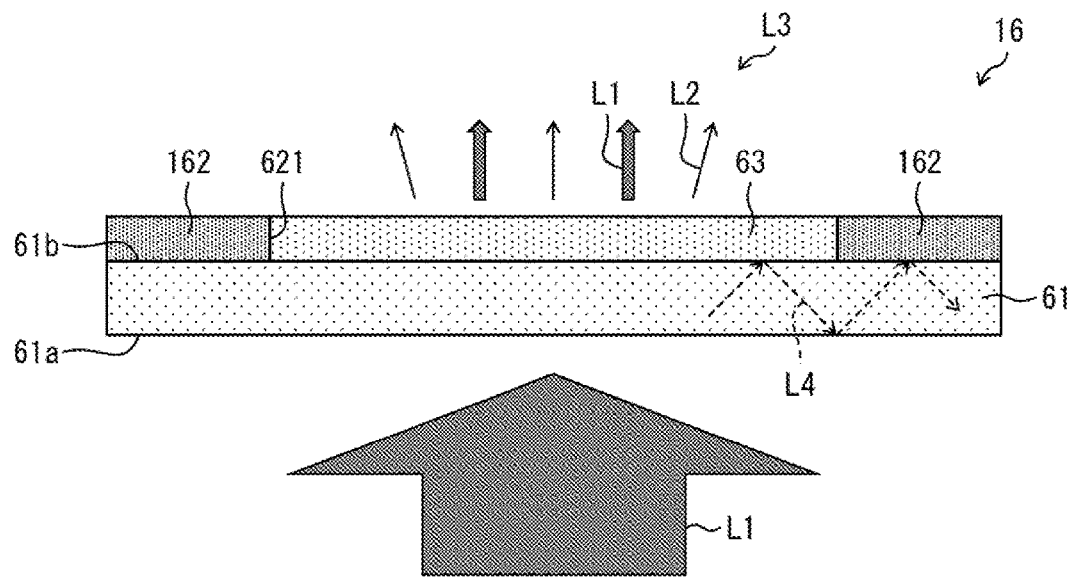
FIG. 6 is a sectional view illustrating an action of the light emission body illustrated in FIG. 5.

FIG. 6 is a sectional view illustrating an action of the light emission body 16 illustrated in FIG. 5. As illustrated in FIG. 6, in the light emission body 16, the laser light L1 and the fluorescence L2 incident on the light passing hole 621 of the reflective layer 162, among the laser light L1 and the fluorescence L2 emitted from the light emitting surface 61b of the fluorescent substance layer 61, are scattered by the scattering layer 63, and thereafter, are emitted toward the light-transmitting lens 8.

Meanwhile, the laser light L1 propagated in an in-layer direction of the fluorescent substance layer 61 and the stray light L4 which is the fluorescence L2, among the laser light L1 and fluorescence L2 emitted from the light emitting surface 61b of the fluorescent substance layer 61, are reflected by the reflective layer 162. Thereby, it is possible to suppress emission of the stray light L4 from the light emitting surface 61b.

As such, in the light emission body 16, the laser light L1 and the fluorescence L2 passing through the light passing hole 621 of the reflective layer 162 are emitted toward the light-transmitting lens 8 and are used as the illumination light L3. Here, a part of the laser light L1 and the fluorescence L2 incident on the light passing hole 621 passes through the light passing hole 621 while being reflected by the reflective layer 162. Accordingly, the laser light L1 and the fluorescence L2 incident on the light passing hole 621 can pass through the light passing hole 621 without being lost.

In addition, in the light emission body 16, a part of the laser light L1, among the stray light L4 whose emission from the light emitting surface 61b of the fluorescent substance layer 61 is suppressed by the reflective layer 162, is converted into the fluorescence layer L2 in the fluorescent substance layer 61. A part of the fluorescence L2 propagates into the fluorescent substance layer 61, passes through the light passing hole 621, and is emitted to the outside. As such, in the light emission body 16, a part of the laser light L1 that becomes the stray light L4 can be reused as excitation light. Accordingly, it is possible to improve utilization efficiency of the laser light L1, and to obtain the light emission body 16 with higher luminance.

[Effects of Light Emission Body 16]

The light emission body 16 according to the present embodiment includes the reflective layer 162 that reflects the laser light L1 and the fluorescence L2 as a light blocking layer.

In the light emission body 16, the laser light L1 propagated in an in-layer direction of the fluorescent substance layer 61 and the stray light L4 that is the fluorescence L2 are reflected by the reflective layer 162. Accordingly, it is possible to suppress emission of the stray light L4 from the light emitting surface 61b.

In addition, a part of the laser light L1 and the fluorescence L2 incident on the light passing hole 621 passes through the light passing hole 621 while being reflected by the reflective layer 162. Accordingly, the laser light L1 and the fluorescence L2 incident on the light passing hole 621 can pass through the light passing hole 621 without being lost.

Thus, according to the present embodiment, it is possible to realize the light emission body 16 with improved light utilization efficiency while simultaneously improving spot feature and color unevenness of the illumination light L3.

Embodiment 3

Another embodiment according to the present invention will be described with reference to FIG. 7 as follows. In the present embodiment, still another configuration example of the light emission body according to the present invention will be described.

For the sake of convenient description, members having the same functions as the members described in the above embodiment are denoted by the same reference numerals or symbols, and description thereof will be omitted.

[Configuration of Light Emission Body 26]

Figure 7:
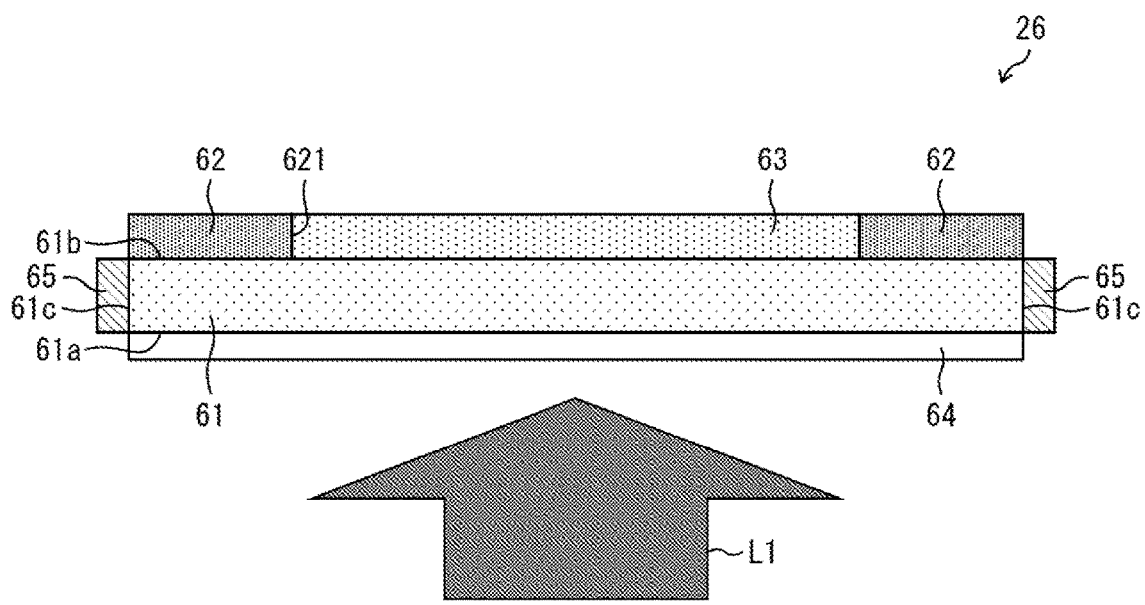
FIG. 7 is a sectional view illustrating a configuration of a light emission body according to Embodiment 3 of the present invention.

FIG. 7 is a sectional view illustrating a configuration of a light emission body 26 according to the present embodiment. As illustrated in FIG. 7, the light emission body 26 includes the fluorescent substance layer 61, the light absorption layer 62, the scattering layer 63, a dichroic mirror (optical layer) 64, and a first reflective film 65.

(Dichroic Mirror 64)

The dichroic mirror 64 is an optical element that selectively reflects light in a specific wavelength range and transmits light in other wavelength ranges. The dichroic mirror 64 is a stacked structure in which dielectric layers are stacked.

The dichroic mirror 64 is provided so as to cover the light irradiation surface 61a of the fluorescent substance layer 61. The dichroic mirror 64 transmits the laser light L1 emitted from the emission end portion 3b of the optical fiber 3. In addition, the dichroic mirror 64 reflects the fluorescence L2 generated inside the fluorescent substance layer 61 toward the light irradiation surface 61a. Accordingly, leakage of the fluorescence L2 generated inside the fluorescent substance layer 61 from the light irradiation surface 61a can be suppressed by the dichroic mirror 64.

(First Reflective Film 65)

The first reflective film 65 is a reflective member that reflects the laser light L1 and the fluorescence L2. The first reflective film 65 is configured by a film formed of aluminum or silver, or the like.

The first reflective film 65 is provided on a side surface 61c of the fluorescent substance layer 61 connecting the light irradiation surface 61a to the light emitting surface 61b. Accordingly, leakage of the laser light L1 and the fluorescence L2 from the side surface 61c of the fluorescent substance layer 61 can be suppressed by the first reflective film 65.

[Effect of Light Emission Body 26]

The light emission body 26 according to the present embodiment includes the dichroic mirror 64 that is disposed on the light irradiation surface 61a side of the fluorescent substance layer 61, transmits the laser light L1 emitted from the emission end portion 3b of the optical fiber 3, and reflects the fluorescence L2 generated inside the fluorescent substance layer 61 toward the light irradiation surface 61a.

In the light emission body 26, leakage of the fluorescence L2 generated inside the fluorescent substance layer 61 from the light irradiation surface 61a can be suppressed by the dichroic mirror 64. Accordingly, it is possible to increase the amount of light of the laser light L1 and the fluorescence L2 incident on the light passing hole 621.

In addition, in the light emission body 26, leakages of the laser light L1 and the fluorescence L2 from the side surface 61c of the fluorescent substance layer 61 can be suppressed by the first reflective film 65. Accordingly, it is possible to increase the amount of light of the laser light L1 and the fluorescence L2 incident on the light passing hole 621.

Thus, according to the present embodiment, it is possible to realize the light emission body 26 with improved light utilization efficiency while simultaneously improving spot feature of the illumination light L3 and reducing color unevenness of the illumination light L3.

Embodiment 4

Another embodiment according to the present invention will be described with reference to FIG. 8 as follows. In the present embodiment, still another configuration example of the light emission body according to the present invention will be described.

For the sake of convenient description, members having the same functions as the members described in the above embodiment are denoted by the same reference numerals or symbols, and description thereof will be omitted.

[Configuration of Light Emission Body 36]

Figure 8:
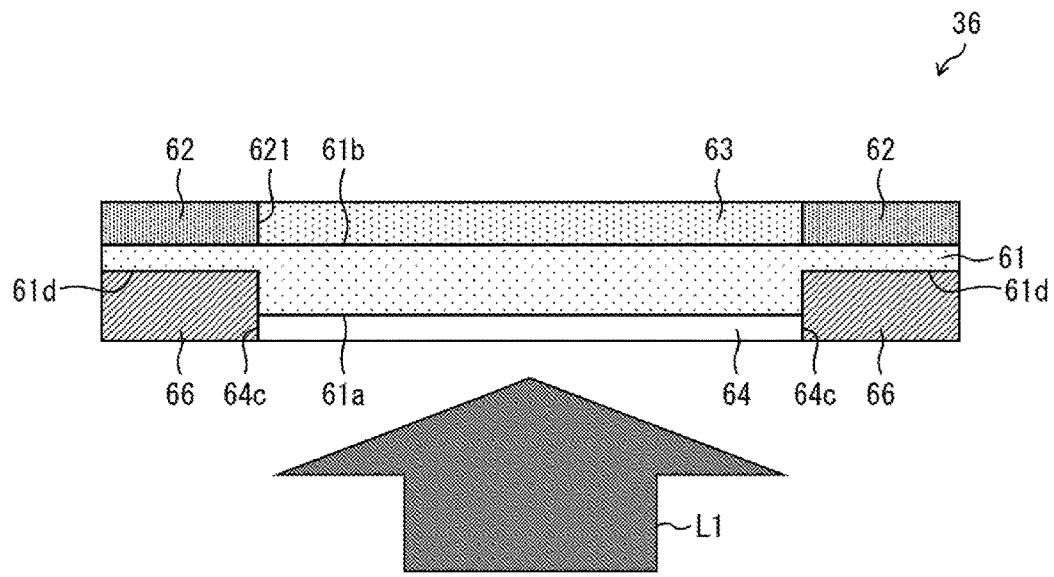
FIG. 8 is a sectional view illustrating a configuration of a light emission body according to Embodiment 4 of the present invention.

FIG. 8 is a sectional view illustrating a configuration of a light emission body 36 according to the present embodiment. As illustrated in FIG. 8, the light emission body 36 includes the fluorescent substance layer 61, the light absorption layer 62, the scattering layer 63, the dichroic mirror 64, and a second reflective film 66.

(Second Reflective Film 66)

The second reflective film 66 is a reflective member that reflects the laser light L1 and the fluorescence L2. The second reflective film 66 is configured by a film formed of aluminum or silver or, the like.

The second reflective film 66 is provided in a notch portion 61d formed along an edge of the light irradiation surface 61a of the fluorescent substance layer 61. The second reflective film 66 covers the notch portion 61d, or the notch portion 61d and a side surface 64c of the dichroic mirror 64 provided on the light irradiation surface 61a. Accordingly, leakage of the laser light L1 and the fluorescence L2 from the edge of the light irradiation surface 61a of the fluorescent substance layer 61 can be suppressed by the second reflective film 66.

The second reflective film 66 can be easily formed, for example, by previously forming the notch portion 61d in the fluorescent substance layer 61 by performing etching or cutting, and forming the second reflective film 66 in the notch portion 61d.

[Effects of Light Emission Body 36]

In the light emission body 36 according to the present embodiment, the second reflective film 66 that reflects the laser light L1 and the fluorescence L2 is provided at a notch portion 61d formed along the edge of the light irradiation surface 61a.

In the light emission body 36, leakage of the laser light L1 and the fluorescence L2 from the edge of the light irradiation surface 61a of the fluorescent substance layer 61 can be suppressed by the second reflective film 66. Accordingly, it is possible to increase the amount of light of the laser light L1 and the fluorescence L2 incident on the light passing hole 621.

Thus, according to the present embodiment, it is possible to realize the light emission body 36 with improved light utilization efficiency while simultaneously improving spot feature and color unevenness of the illumination light L3.

In addition, as described above, the second reflective film 66 can be easily formed, for example, by previously forming the notch portion 61d in the fluorescent substance layer 61 such as a small void fluorescent substance plate by performing etching or cutting, and thereafter, forming the second reflective film 66.

Thus, according to the present embodiment, it is possible to simply manufacture the light emission body 36 with improved light utilization efficiency while simultaneously improving spot feature and color unevenness of the illumination light L3.

Embodiment 5

Another embodiment according to the present invention will be described with reference to FIG. 9 as follows. In the present embodiment, still another configuration example of the light emission body according to the present invention will be described.

For the sake of convenient description, members having the same functions as the members described in the above embodiment are denoted by the same reference numerals or symbols, and description thereof will be omitted.

[Configuration of Light Emission Body 46]

Figure 9:
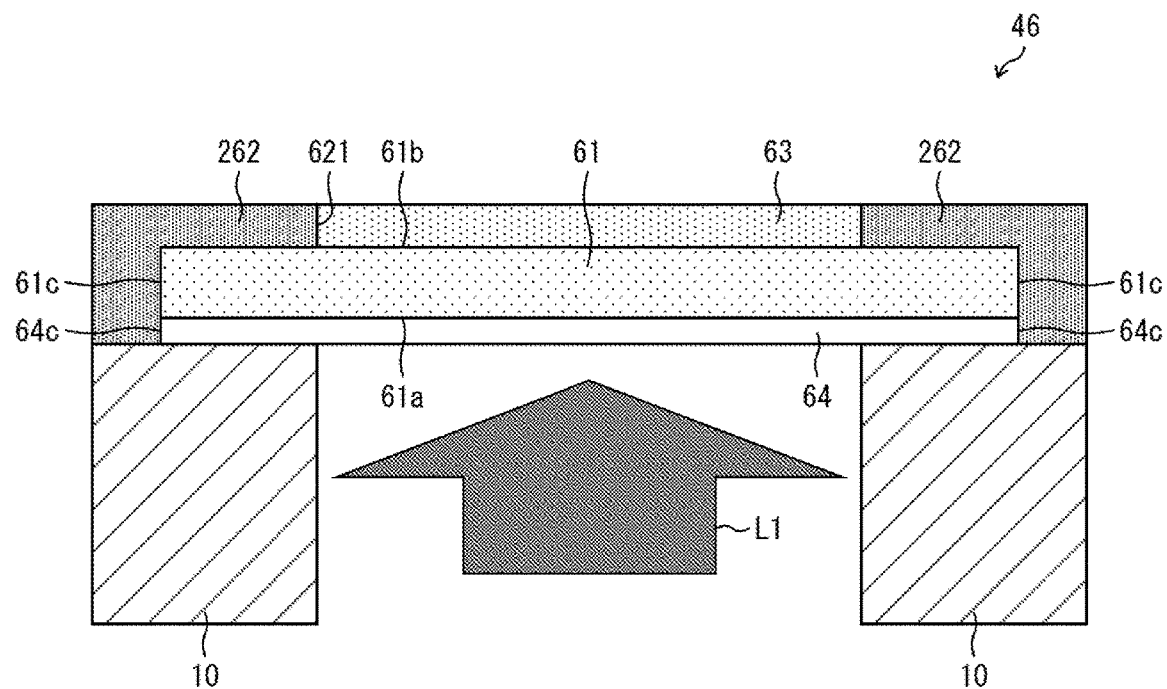
FIG. 9 is a sectional view illustrating a configuration of a light emission body according to Embodiment 5 of the present invention.

FIG. 9 is a sectional view illustrating a configuration of a light emission body 46 according to the present embodiment. As illustrated in FIG. 9, the light emission body 46 includes the fluorescent substance layer 61, a light absorption layer (light blocking layer) 262, the scattering layer 63, and the dichroic mirror 64. In the light emission body 46, the edge of the light irradiation surface 61a of the fluorescent substance layer 61 is supported by a fixing jig 10.

(Light Absorption Layer 262)

The light absorption layer 262 is a layer that absorbs the laser light L1 and the fluorescence L2 emitted from the light emitting surface 61b of the fluorescent substance layer 61. The light absorption layer 262 covers not only a peripheral edge portion of the light emitting surface 61b, but also the side surface 61c of the fluorescent substance layer 61 connecting the light irradiation surface 61a to the light emitting surface 61b, and the side surface 64c of the dichroic mirror 64. In addition, a part of the light absorption layer 262 is in contact with the fixing jig 10 supporting the light emission body 46.

(Fixing Jig 10)

The fixture 10 is a support member that supports the light emission body 46. The fixing jig 10 is formed of a metal (for example, aluminum, copper, or iron). Accordingly, the fixing jig 10 has high thermal conductivity and can efficiently dissipate heat generated by the fluorescent substance layer 61.

[Effects of Light Emission Body 46]

In the light emission body 46 according to the present embodiment, the light absorption layer 262 covers the side surface 61c of the fluorescent substance layer 61 connecting the light irradiation surface 61a of the fluorescent substance layer 61 to the light emitting surface 61b.

In the light emission body 46, leakage of the laser light L1 and the fluorescence L2 from the side surface 61c of the fluorescent substance layer 61 can be suppressed by the light absorption layer 262. Accordingly, it is possible to increase the amount of light of the laser light L1 and the fluorescence L2 incident on the light passing hole 621.

In addition, in the light emission body 46, a part of the light absorption layer 262 is in contact with the fixing jig 10 supporting the light emission body 46. Accordingly, it is possible to efficiently dissipate heat by transferring the heat generated by the fluorescent substance layer 61 to the fixing jig 10 via the light absorption layer 262.

Thus, according to the present embodiment, it is possible to realize the light emission body 46 with improved light utilization efficiency while simultaneously improving spot feature and color unevenness of the illumination light L3.

Embodiment 6

Another embodiment according to the present invention will be described with reference to FIG. 10 as follows. In the present embodiment, still another configuration example of the light emission body according to the present invention will be described.

For the sake of convenient description, members having the same functions as the members described in the above embodiment are denoted by the same reference numerals or symbols, and description thereof will be omitted.

[Configuration of Light Emission Body 56]

Figure 10:
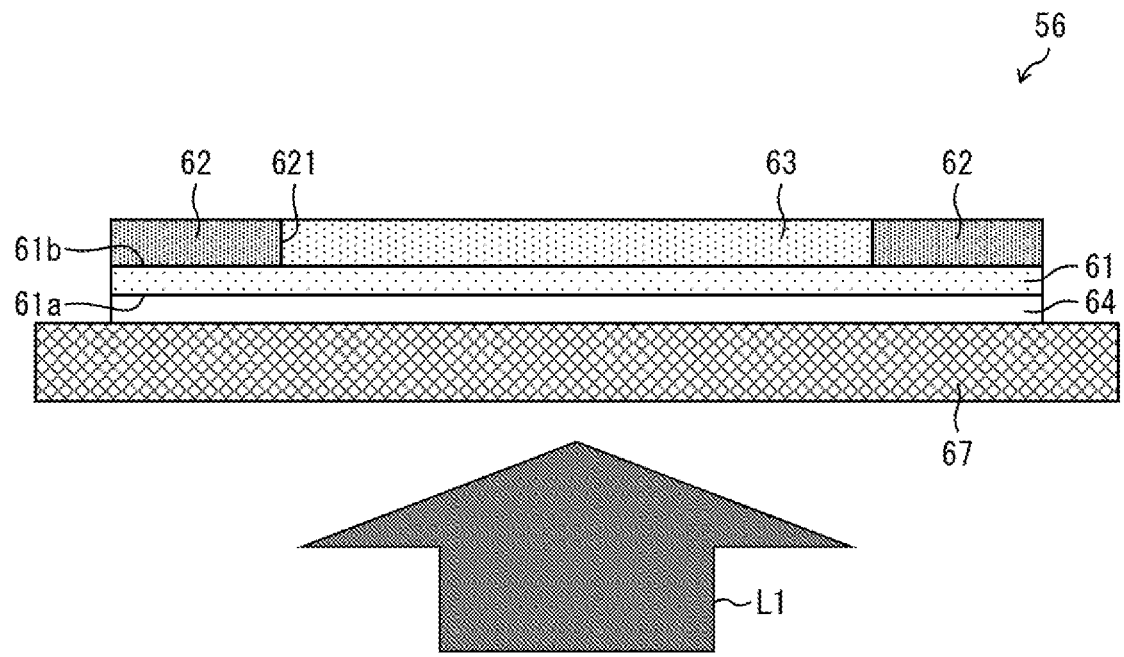
FIG. 10 is a sectional view illustrating a configuration of a light emission body according to Embodiment 6 of the present invention.

FIG. 10 is a sectional view illustrating a configuration of a light emission body 56 according to the present embodiment. As illustrated in FIG. 10, the light emission body 56 includes the fluorescent substance layer 61, the light absorption layer 62, the scattering layer 63, the dichroic mirror 64, and a light-transmitting substrate 67.

(Light-Transmitting Substrate 67)

The light-transmitting substrate 67 is a transparent substrate that supports the fluorescent substance layer 61. The light-transmitting substrate 67 is formed of, for example, glass, sapphire or the like. Particularly, a material of the light-transmitting substrate 67 is desired to be formed of a material with high thermal conductivity such as sapphire in order to dissipate heat generated by the fluorescent substance layer 61.

The laser light L1 emitted from the emission end portion 3b of the optical fiber 3 transmits the light-transmitting substrate 67 and is applied to the light irradiation surface 61a of the fluorescent substance layer 61.

[Effects of Light Emission Body 56]

The light emission body 56 according to the present embodiment further includes the light-transmitting substrate 67 that is provided on the light irradiation surface 61a side of the fluorescent substance layer 61 and supports the fluorescent substance layer 61.

In the light emission body 56, since the fluorescent substance layer 61 is supported by the light-transmitting substrate 67, a thickness of the fluorescent substance layer 61 can be reduced to a thickness smaller than or equal to 100 µm. Generally, in a case where the thickness of the fluorescent substance layer 61 is smaller than or equal to 100 µm, a mechanical strength of the fluorescent substance layer 61 is greatly lowered. Accordingly, it is hard to fix the fluorescent substance layer 61 having a thickness smaller than or equal to 100 µm in the illumination device 1. Therefore, since a decrease in the mechanical strength of the fluorescent substance layer 61 can be compensated by supporting the fluorescent substance layer 61 using the light-transmitting substrate 67, it is possible to set the thickness of the fluorescent substance layer 61 to a thickness smaller than or equal to 100 µm.

As such, propagation of the laser light L1 and fluorescence L2 in the fluorescent substance layer 61 is suppressed by reducing the thickness of the fluorescent substance layer 61. Accordingly, the laser light L1 and the fluorescence L2 are easily emitted from the light emitting surface 61b.

Thus, according to the present embodiment, it is possible to realize the light emission body 56 with improved light utilization efficiency while simultaneously improving spot feature and color unevenness of the illumination light L3.

Embodiment 7

Another embodiment according to the present invention will be described with reference to FIG. 11 as follows. In the present embodiment, still another configuration example of the light emission body according to the present invention will be described.

For the sake of convenient description, members having the same functions as the members described in the above embodiment are denoted by the same reference numerals or symbols, and description thereof will be omitted.

[Configuration of Light Emission Body 76]

Figure 11:
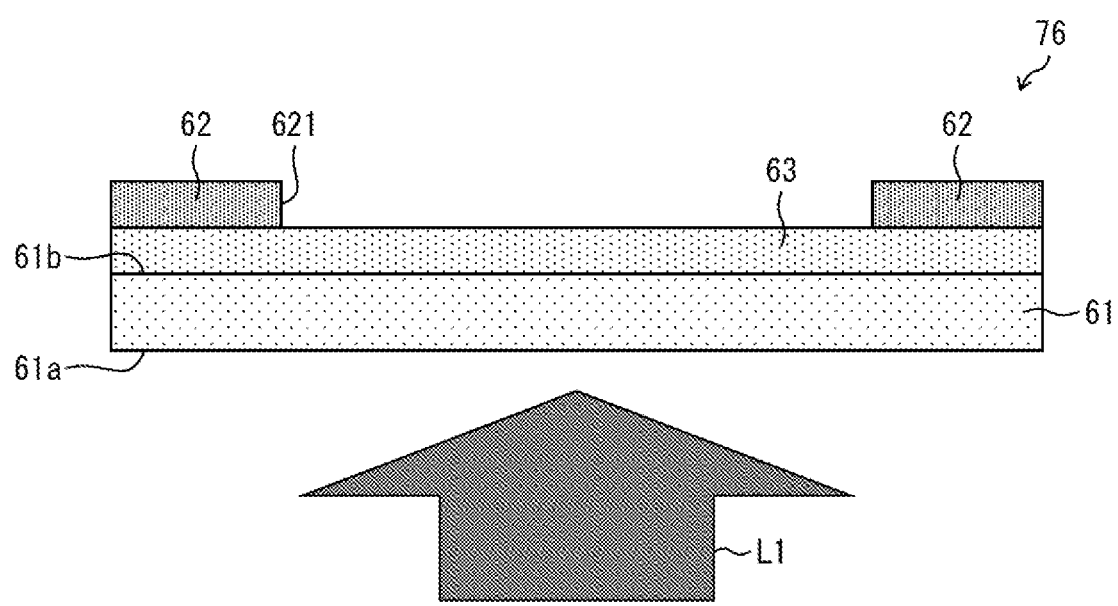
FIG. 11 is a sectional view illustrating a configuration of a light emission body according to Embodiment 7 of the present invention.

FIG. 11 is a sectional view illustrating a configuration of a light emission body 76 according to the present embodiment. As illustrated in FIG. 11, the light emission body 76 includes the fluorescent substance layer 61, the light absorption layer 62, and the scattering layer 63. Specifically, in the light emission body 76, the scattering layer 63 is provided between the fluorescent substance layer 61 and the light absorption layer 62.

In the light emission body 76, the laser light L1 and the fluorescence L2 emitted from the light emitting surface 61b of the fluorescent substance layer 61 are incident on the scattering layer 63 and are scattered. Among the laser light L1 and the fluorescence L2 scattered by the scattering layer 63, the laser light L1 and the fluorescence L2 incident on the light passing hole 621 of the light absorption layer 62 are emitted toward the light-transmitting lens 8. Meanwhile, among the laser light L1 and the fluorescence L2 scattered by the scattering layer 63, the laser light L1 and the fluorescence L2 that are not incident on the light passing hole 621 are absorbed by the light absorption layer 62.

[Effects of Light Emission Body 76]

The light emission body 76 according to the present embodiment includes the fluorescent substance layer 61, the light absorption layer 62, and the scattering layer 63, and the scattering layer 63 is provided between the fluorescent substance layer 61 and the light absorption layer 62.

Even in the light emission body 76 having such a layer structure, the laser light L1 and the fluorescence L2 emitted from the light emitting surface 61b of the fluorescent substance layer 61 are absorbed by the light absorption layer 62 and are scattered by the scattering layer 63, and thereby, it is possible to simultaneously improve spot feature and color unevenness of the illumination light L3.

Thus, according to the present embodiment, it is possible to realize the light emission body 76 capable of simultaneously improving the spot feature and the color unevenness of the illumination light L3.

In addition, in the light emission body 76, since the scattering layer 63 is formed so as to cover the entire light emitting surface 61b of the fluorescent substance layer 61, there is no demand to etch the scattering layer 63. Accordingly, it is possible to reduce a patterning process at the time of manufacturing the light emission body 76. For example, in a case of a method of patterning (painting) using a mask or the like, a process of aligning the mask for forming the scattering layer 63 is not demanded, and thereby, the light emission body 76 can be easily produced.

Thus, according to the present embodiment, it is possible to simply manufacture the light emission body 76 with improved light utilization efficiency while simultaneously improving spot feature and color unevenness of the illumination light L3.

In the present embodiment, the light emission body 76 has a configuration in which the fluorescent substance layer 61, the scattering layer 63, and the light absorption layer 62 are stacked in this order, but the present invention is not limited to the configuration. The light emission body 76 may have a configuration in which the fluorescent substance layer 61, the light absorption layer 62, and the scattering layer 63 are stacked in this order.

In addition, in the present embodiment, the light emission body 76 includes the light absorption layer 62 as a light blocking layer, but the present invention is not limited to the configuration. The light emission body 76 may include the reflective layer 162 instead of the light absorption layer 62.

Embodiment 8

Another embodiment according to the present invention will be described with reference to FIG. 12 as follows. In the present embodiment, still another configuration example of the light emission body according to the present invention will be described.

For the sake of convenient description, members having the same functions as the members described in the above embodiment are denoted by the same reference numerals or symbols, and description thereof will be omitted.

[Configuration of Light Emission Body 86]

Figure 12:
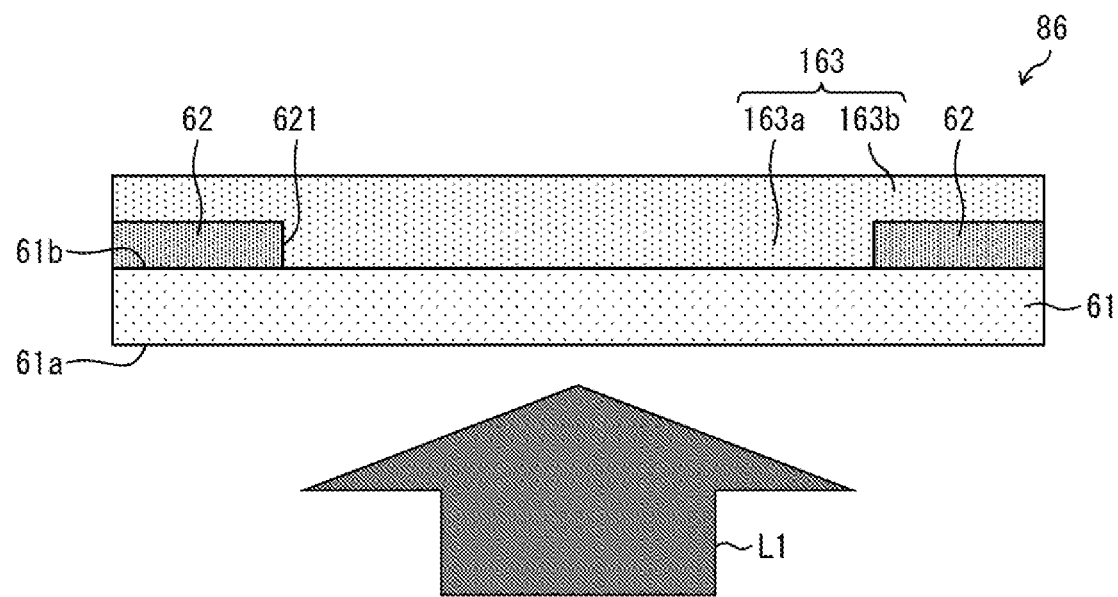
FIG. 12 is a sectional view illustrating a configuration of a light emission body according to Embodiment 8 of the present invention.

FIG. 12 is a sectional view illustrating a configuration of a light emission body 86 according to the present embodiment. As illustrated in FIG. 12, the light emission body 86 includes the fluorescent substance layer 61, the light absorption layer 62, and the scattering layer 163.

(Scattering Layer 163)

The scattering layer 163 is a layer that scatters the laser light L1 and the fluorescence L2 which are not blocked by the light absorption layer 62. The scattering layer 163 includes a first region 163a buried in the light passing hole 621 and a second region 163b covering the first region 163a and the light absorption layer 62.

Accordingly, in the light emission body 86, the laser light L1 and the fluorescence L2 incident on the light passing hole 621 are scattered by the first region 163a of the scattering layer 163 inside the light passing hole 621. In addition, the laser light L1 and the fluorescence L2 emitted from the light passing hole 621 are further scattered by the second region 163b of the scattering layer 163. Thus, in the light emission body 86, it is possible to sufficiently mix the laser light L1 and the fluorescence L2.

[Effects of Light Emission Body 86]

In the light emission body 86 according to the present embodiment, the scattering layer 163 includes the first region 163a buried in the light passing hole 621 and the second region 163b covering the first region 163a and the light absorption layer 62.

In the light emission body 86, the laser light L1 and fluorescence L2 incident on the light passing hole 621 are scattered by the first region 163a and the second region 163b of the scattering layer 163. Accordingly, it is possible to sufficiently mix the laser light L1 and the fluorescence L2 incident on the light passing hole 621.

Thus, according to the present embodiment, it is possible to realize the light emission body 86 capable of effectively improving color unevenness of the illumination light L3.

In addition, in the light emission body 86, since there is no demand to etch the scattering layer 163, it is possible to reduce the number of patterning processes at the time of manufacturing the light emission body 86. For example, in a case of a method of patterning (painting) using a mask or the like, there is no demand to perform a process of aligning the mask for forming the scattering layer 163, and thereby, the light emission body 86 can be easily produced.

Thus, according to the present embodiment, it is possible to simply manufacture the light emission body 86 with improved light utilization efficiency while simultaneously improving spot feature and color unevenness of the illumination light L3.

In the present embodiment, the light emission body 86 includes the light absorption layer 62 as a light blocking layer, but the present invention is not limited to the configuration. The light emission body 86 may include the reflective layer 162 instead of the light absorption layer 62.

[Summarization]

A light emission body according to Aspect 1 of the present invention includes a fluorescent substance layer that has a light irradiation surface which is irradiated with excitation light and a light emitting surface which is located on a side opposite to the light irradiation surface, and that emits the excitation light (laser light L1) and fluorescence which is obtained by wavelength-converting a part of the excitation light, from the light emitting surface; a light blocking layer (light absorption layer 62 and 262, reflective layer 162) that blocks the excitation light and the fluorescence which are emitted from the light emitting surface; and a scattering layer that is provided on the light emitting surface side and scatters the excitation light and the fluorescence which hare not blocked by the light blocking layer.

In the above configuration, excitation light and fluorescence which are not blocked by a light blocking layer, among excitation light and fluorescence emitted from a light emitting surface, are emitted to the outside of a light emission body, and are used as illumination light. That is, in a case of viewing from a light emitting surface side of a fluorescent substance layer, a region where the light blocking layer is not provided functions as an emission region of the illumination light (excitation light and fluorescence). Accordingly, for example, the light blocking layer is provided such that the emission region of the illumination light has a small spot shape, and thereby, it is possible to improve spot feature of the illumination light.

In addition, in the above configuration, excitation light and fluorescence which are not blocked by the light blocking layer are scattered by a scattering layer. Accordingly, the excitation light and the fluorescence used as the illumination light can be sufficiently mixed, and color unevenness of the illumination light can be reduced.

Thus, according to the above configuration, it is possible to realize a light emission body capable of simultaneously improving spot feature and color unevenness of the illumination light.

In a light emission body according to Aspect 2 of the present invention, in the above Aspect 1, the fluorescent substance layer may be a small void fluorescent substance plate that generates the fluorescence as the excitation light is applied.

A fluorescent substance layer configured by a small void fluorescent substance plate such as a fluorescent substance single crystal plate or a fluorescent substance polycrystalline plate has excellent thermal conductivity and temperature characteristics. Accordingly, even in a case where excitation light with high density is applied, a temperature of the fluorescent substance layer hardly rises, and even if the temperature rises, light emission efficiency hardly decreases. Thus, by using the fluorescent substance layer configured by the small void fluorescent substance plate, it is possible to realize a light emission body with high luminance. Meanwhile, scattering (internal scattering) hardly occur in the fluorescent substance layer configured by the small void fluorescent substance plate. Accordingly, in a case where the fluorescent substance layer configured by the small void fluorescent substance plate is used, a decrease in spot feature of illumination light and color unevenness is remarkable.

In the above configuration, even in a case where a fluorescent substance layer configured by a small void fluorescent substance plate is used, spot feature can be improved and color unevenness of illumination light can be simultaneously reduced by a light blocking layer and a scattering layer.

Thus, according to the above configuration, it is possible to realize a light emission body with high luminance while simultaneously improving spot feature and color unevenness of illumination light.

In a light emission body according to Aspect 3 of the present invention, in the Aspect 2, there may be no void in the fluorescent substance layer.

A fluorescent substance layer having no void such as a fluorescent substance single crystal plate has a particularly high thermal conductivity. Accordingly, even in a case where excitation light with high density is applied, heat generated by the fluorescent substance layer can be dissipated more effectively.

Thus, according to the above configuration, it is possible to realize a light emission body with higher luminance.

In a light emission body according to aspect 4 of the present invention, in the above Aspect 1 to Aspect 3, the light blocking layer may have a light passing hole through which the excitation light and the fluorescence that are emitted from the light emitting surface pass, and the light passing hole may be closed by the scattering layer.

In the above configuration, among excitation light and fluorescence emitted from a light emitting surface, the excitation light and the fluorescence incident on a light passing hole are emitted to the outside of a light emission body and are used as illumination light. Meanwhile, the excitation light and the fluorescence that are not incident on the light passing hole, that is, the excitation light and the fluorescence (stray light) that propagate in an in-layer direction of a fluorescent substance layer are blocked by a light blocking layer provided so as to close the light passing hole. Accordingly, emission of the stray light from the light emitting surface of the fluorescent substance layer can be suppressed. In addition, since the excitation light and the fluorescence are necessarily scattered by a scattering layer, it is possible to reliably mix the excitation light and the fluorescence.

Thus, according to the above configuration, it is possible to suitably realize a light emission body capable of simultaneously improving spot feature and color unevenness of illumination light.

In a light emission body according to Aspect 5 of the present invention, in the above Aspect 4, a central axis of the light passing hole may approximately coincide with an optical axis of the excitation light which is applied to the light irradiation surface.

In the above configuration, excitation light applied to a light irradiation surface and fluorescence generated by a fluorescent substance layer can be efficiently incident on a light passing hole.

Thus, according to the above configuration, it is possible to improve utilization efficiency of light.

In a light emission body according to Aspect 6 of the present invention, in the above Aspect 1 to Aspect 5, the light blocking layer may be a light absorption layer that absorbs the excitation light and the fluorescence, or a reflective layer that reflects the excitation light and the fluorescence.

In a case where a light blocking layer is a light absorption layer, excitation light and fluorescence propagating in an in-layer direction of a fluorescent substance layer are absorbed by the light absorption layer. In a case where the light blocking layer is a reflective layer, the excitation light and the fluorescence propagated in the in-layer direction of the fluorescent substance layer are reflected by the reflective layer.

Thus, according to the above configuration, it is possible to suppress emission of stray light from a light emitting surface of a fluorescent substance layer.

Alight emission body according to Aspect 7 of the present invention, in the above Aspects 1 to Aspect 6, may further include an optical layer (dichroic mirror 64) that is provided on the light irradiation surface side, and the optical layer may transmit the excitation light that is emitted from an excitation light source and may reflect the fluorescence that is generated inside the fluorescent substance layer toward the light irradiation surface.

In the above configuration, leakage of fluorescence from a light irradiation surface can be suppressed by an optical layer.

Thus, according to the above configuration, it is possible to improve utilization efficiency of fluorescence.

In a light emission body according to Aspect 8 of the present invention, in the above Aspect 1 to Aspect 7, the light blocking layer may cover a side surface of the fluorescent substance layer connecting the light irradiation surface to the light emitting surface.

In the above configuration, leakage of excitation light and fluorescence from a side surface of a fluorescent substance layer can be suppressed by a light blocking layer.

Thus, according to the above configuration, it is possible to improve utilization efficiency of excitation light and fluorescence.

In a light emission body according to Aspect 9 of the present invention, in the above Aspect 1 to Aspect 7, a first reflective film that reflects the excitation light and the fluorescence may be provided on a side surface of the fluorescent substance layer connecting the light irradiation surface to the light emitting surface.

In the above configuration, leakage of excitation light and fluorescence from a side surface of a fluorescent substance layer can be suppressed by a first reflective film.

Thus, according to the above configuration, it is possible to improve utilization efficiency of light.

In a light emission body according to aspect 10 of the present invention, in the above Aspect 1 to Aspect 9, the fluorescent substance layer may have a notch portion that is formed along an edge of the light irradiation surface, and a second reflective film that reflects the excitation light and the fluorescence may be provided in the notch portion.

According to the above configuration, leakage of the excitation light and fluorescence from an edge of a light irradiation surface can be suppressed by a second reflective film.

Thus, according to the above configuration, it is possible to improve utilization efficiency of excitation light and fluorescence.

A light emission body according to Aspect 11 of the present invention, in the above Aspect 1 to Aspect 10, may further include a light-transmitting substrate that is provided on the light irradiation surface side and supports the fluorescent substance layer.

In the above configuration, since a fluorescent substance layer is supported by a light-transmitting substrate, a thickness of the fluorescent substance layer can be reduced. Propagation of excitation light and fluorescence into the fluorescent substance layer is suppressed by reducing the thickness of the fluorescent substance layer, and thereby, the excitation light and the fluorescence are easily emitted from a light emitting surface.

Thus, according to the above configuration, it is possible to improve utilization efficiency of the excitation light and fluorescence.

An illumination device according to Aspect 12 of the present invention may include a light emission body according to Aspect 1 to Aspect 11, and an excitation light source that applies the excitation light to the light irradiation surface.

According to the above configuration, it is possible to realize an illumination device capable of simultaneously improving spot feature and color unevenness of illumination light.

The present invention is not limited to the above embodiments, and various modifications can be made within the scope indicated in Claims, and embodiments obtained by appropriately combining technical means disclosed in different embodiments are also included in the technical scope of the present invention. Furthermore, new technical features can be formed by combining technical means disclosed in the respective embodiments.

REFERENCE SIGNS LIST

1 ILLUMINATION DEVICE
2 LASER ELEMENT (EXCITATION LIGHT SOURCE)

6,16,26,36,46,56,76,86 LIGHT EMISSION BODY
61 FLUORESCENT SUBSTANCE LAYER
61a LIGHT IRRADIATION SURFACE
61b LIGHT EMITTING SURFACE
61c SIDE SURFACE
62,262 LIGHT ABSORPTION LAYER (LIGHT BLOCKING LAYER)
63,163 SCATTERING LAYER
64 DICHROIC MIRROR (OPTICAL LAYER)
65 FIRST REFLECTIVE FILM
66 SECOND REFLECTIVE FILM
162 REFLECTIVE LAYER (LIGHT BLOCKING LAYER)
163a FIRST REGION (SCATTERING LAYER)
163b SECOND REGION (SCATTERING LAYER)
L1 LASER LIGHT (EXCITATION LIGHT)
L2 FLUORESCENCE
L3 ILLUMINATION LIGHT
L4 STRAY LIGHT

The invention claimed is:

1. A light emission body comprising:
a fluorescent substance layer that has a light irradiation surface which is irradiated with excitation light and a light emitting surface which is located on a side opposite to the light irradiation surface, and that emits the excitation light and fluorescence which is obtained by wavelength-converting a part of the excitation light, from the light emitting surface;
a light blocking layer that blocks the excitation light and the fluorescence which are emitted from the light emitting surface; and
a scattering layer that is provided on the light emitting surface side and scatters the excitation light and the fluorescence which are not blocked by the light blocking layer;
wherein the fluorescent substance layer is configured by a small void fluorescent substance plate that generates the fluorescence as the excitation light is applied, and
wherein the excitation light is laser light in a wavelength range larger than or equal to 420 nm and smaller than or equal to 490 nm.

2. The light emission body according to claim 1, wherein there is no void in the fluorescent substance layer.

3. The light emission body according to claim 1, wherein the light blocking layer has a light passing hole through which the excitation light and the fluorescence that are emitted from the light emitting surface pass, and wherein the light passing hole is closed by the scattering layer.

4. The light emission body according to claim 3, wherein a central axis of the light passing hole approximately coincides with an optical axis of the excitation light which is applied to the light irradiation surface.

5. The light emission body according to claim 1, wherein the light blocking layer is a light absorption layer that absorbs the excitation light and the fluorescence, or a reflective layer that reflects the excitation light and the fluorescence.

6. The light emission body according to claim 1, further comprising:
an optical layer that is provided on the light irradiation surface side,
wherein the optical layer transmits the excitation light that is emitted from an excitation light source and reflects the fluorescence that is generated inside the fluorescent substance layer toward the light irradiation surface.

7. The light emission body according to claim 1, wherein the light blocking layer covers a side surface of the fluorescent substance layer that connects the light irradiation surface to the light emitting surface.

8. The light emission body according to claim 1, wherein a first reflective film that reflects the excitation light and the fluorescence is provided on a side surface of the fluorescent substance layer which connects the light irradiation surface to the light emitting surface.

9. The light emission body according to claim 1, wherein the fluorescent substance layer has a notch portion that is formed along an edge of the light irradiation surface, and
wherein a second reflective film that reflects the excitation light and the fluorescence is provided in the notch portion.

10. The light emission body according to claim 1, further comprising:
a light-transmitting substrate that is provided on the light irradiation surface side and supports the fluorescent substance layer.

11. An illumination device comprising:
a light emission body according to claim 1; and
an excitation light source that applies the excitation light to the light irradiation surface.

* * * * *